US008832037B2

(12) United States Patent
Boldo et al.

(10) Patent No.: US 8,832,037 B2
(45) Date of Patent: Sep. 9, 2014

(54) ADAPTIVE QUIESCE FOR EFFICIENT CROSS-HOST CONSISTENT CDP CHECKPOINTS

(75) Inventors: Amir Boldo, Haifa (IL); Ori Mamluk, Kibbutz Givat Haim Meuchad (IL); Chen Burshan, Tel Aviv (IL)

(73) Assignee: Zerto Ltd., Herzilya (IL)

( * ) Notice: Subject to any disclaimer, the term of this patent is extended or adjusted under 35 U.S.C. 154(b) by 320 days.

(21) Appl. No.: 13/367,451

(22) Filed: Feb. 7, 2012

(65) Prior Publication Data

US 2013/0204843 A1 Aug. 8, 2013

(51) Int. Cl.
*G06F 17/30* (2006.01)

(52) U.S. Cl.
USPC .............................. 707/674; 707/610; 707/657

(58) Field of Classification Search
CPC ..................... G06F 11/1471; Y10S 707/99953
USPC ........................... 707/610, 615, 649, 657, 674
See application file for complete search history.

(56) References Cited

U.S. PATENT DOCUMENTS

| | | | |
|---|---|---|---|
| 6,658,591 B1 | 12/2003 | Arndt | |
| 6,910,160 B2 | 6/2005 | Bajoria et al. | |
| 6,944,847 B2 | 9/2005 | Desai et al. | |
| 6,981,177 B2 * | 12/2005 | Beattie | 714/20 |
| 7,143,307 B1 | 11/2006 | Witte et al. | |
| 7,475,207 B2 | 1/2009 | Bromling et al. | |
| 7,523,277 B1 | 4/2009 | Kekre et al. | |
| 7,577,817 B2 | 8/2009 | Karpoff et al. | |
| 7,577,867 B2 | 8/2009 | Lewin et al. | |
| 7,603,395 B1 | 10/2009 | Bingham et al. | |
| 7,849,361 B2 | 12/2010 | Ahal et al. | |
| 8,554,733 B2 * | 10/2013 | Suzuki et al. | 707/640 |
| 2004/0068561 A1 | 4/2004 | Yamamoto et al. | |
| 2005/0171979 A1 | 8/2005 | Stager et al. | |
| 2005/0182953 A1 | 8/2005 | Stager et al. | |
| 2005/0188256 A1 | 8/2005 | Stager et al. | |
| 2006/0047996 A1 | 3/2006 | Anderson et al. | |
| 2007/0028244 A1 | 2/2007 | Landis et al. | |

(Continued)

FOREIGN PATENT DOCUMENTS

WO 2009151445 A1 12/2009

OTHER PUBLICATIONS

Olzak, T., "Secure hypervisor-based vitual server environments", Feb. 26, 2007. http://www.techrepublic.com/blog/security/secure-hypervisor-based-virtual-server-environments/160.

(Continued)

*Primary Examiner* — Cheryl Lewis
(74) *Attorney, Agent, or Firm* — Foley & Lardner LLP

(57) ABSTRACT

A disaster recovery system, including a target datastore for replicating data written to source datastores, and a checkpoint engine (i) for transmitting, at multiple times, quiesce commands to a plurality of host computers, each quiesce command including a timeout period that is adjusted at each of the multiple times, (ii) for determining, at each of the multiple times, whether acknowledgements indicating that a host has successfully stopped writing enterprise data to the source datastores, have been received from each of the host computers within the timeout period, (iii) for marking, at each of the multiple times, a cross-host checkpoint in the target datastore and reducing the timeout period for the quiesce commands at the next time, if the determining is affirmative, and (iv) for increasing, at each of the multiple times, the timeout period for the quiesce commands transmitted at the next time, if the determining is not affirmative.

12 Claims, 2 Drawing Sheets

(56) References Cited

U.S. PATENT DOCUMENTS

| | | |
|---|---|---|
| 2008/0086726 A1 | 4/2008 | Griffith et al. |
| 2008/0195624 A1 | 8/2008 | Ponnappan et al. |
| 2009/0249330 A1 | 10/2009 | Abercrombie et al. |
| 2010/0017801 A1 | 1/2010 | Kundapur |
| 2010/0121824 A1* | 5/2010 | Kawamura et al. ........... 707/683 |
| 2010/0198972 A1 | 8/2010 | Umbehocker |
| 2011/0022812 A1 | 1/2011 | van der Linden et al. |
| 2011/0099200 A1 | 4/2011 | Blount et al. |
| 2011/0099342 A1 | 4/2011 | Ozdemir |
| 2011/0125980 A1 | 5/2011 | Brunet et al. |
| 2011/0131183 A1 | 6/2011 | Chandhok et al. |
| 2011/0153569 A1 | 6/2011 | Fachan et al. |
| 2011/0161299 A1 | 6/2011 | Prahlad et al. |
| 2011/0161301 A1 | 6/2011 | Pratt et al. |
| 2012/0151273 A1* | 6/2012 | Ben Or et al. ................... 714/41 |

OTHER PUBLICATIONS

Illuminata EMC RecoverPoint: Beyond Basics CDP Searched via internet on Nov. 10, 2013.

Mendocino: The RecoveryOne Solution, Architecture Guide, 22 pages Product Version 1.0, Jan. 3, 2006.

NetWorker PowerSnap Module for EMC Symmetrix, Realease 2.1 Installation and Administrator's Guide, 238 pgs. printed Sep. 2005.

\* cited by examiner

ADAPTIVE QUIESCE FOR EFFICIENT CROSS-HOST CONSISTENT CDP CHECKPOINTS

FIELD OF THE INVENTION

The present invention relates to data protection.

BACKGROUND OF THE INVENTION

Data lies at the heart of every enterprise, and is a core component of data center infrastructure. As data applications become more and more critical, there is a growing need to ensure complete business continuity.

Disaster recovery systems provide data protection and application recovery. Some disaster recovery systems use virtual data replication within a hypervisor architecture, and are able to recover any point in time.

Disaster recovery systems are typically operative to maintain disk replicas of enterprise data disks. Some disaster recovery systems, referred to as continuous data protection (CDP) systems, enable restoring a disk replica to a previous point in time. CDP systems log each command to write data into a designated address of a dedicated data disk, into one or more write journals. Each journaled set of commands that together constitute a consistent disk image, is stamped with a date and time. At various times, the journaled commands are promoted to the replica disks, to update the replica disk images to a more recent time, and the write journals are then purged and restarted from the more recent time. The purged journal commands are converted to undo journal entries, for use in rolling back data to a time prior to the promotion time.

As such, disk images at any desired recovery point in time may be determined from the replica disk images, the write journals and the undo journals. If the desired recovery point in time is later than the most recent promotion time, then the disk images corresponding to the desired recovery point in time are obtained by applying the write commands that were journaled prior to the desired recovery point in time, to the replica disk images, to roll forward the replica disk data to the desired recovery point in time. If the desired recovery point is earlier than the most recent promotion time, which is generally the case, then the disk images corresponding to the desired recovery point in time are obtained by applying the undo commands that are time stamped after the desired recovery point in time, to the replica disk images, to roll back the replica disk data to the desired recovery point in time.

In a multi-host enterprise environment, continuous data protection (CDP) disaster recovery systems need to perform consistent cross-host journal checkpoints. In order to ensure a consistent enterprise recovery, it is required to checkpoint the write journals when the enterprise disk images correspond to a common point in time. For such marking to be possible, all hosts must be operative to quiesce writes at a common point in time. Quiesce writes for synchronization generally impact performance, and thus must be carefully applied.

Alternatively, some disaster recovery systems synchronize clocks across hosts and timestamp each write operation, to ensure that the writes are properly sequenced in the write journals. Such systems are complicated to deploy with consistency, because it is difficult to synchronize independent clocks to the millisecond.

Other conventional disaster recovery systems send a quiesce command to all hosts, receive acknowledgements of successful quiescence, take a consistent snapshot image of all disks, and then send release quiesce commands. Such systems are exposed to a risk of reducing performance of enterprise data applications.

It would thus be of advantage to enable cross-host consistent CDP checkpointing, without requiring synchronized clocks and without reducing performance of data applications.

SUMMARY OF THE DESCRIPTION

Aspects of the present invention overcome drawbacks of conventional disaster recovery systems, and provide efficient adaptive quiesce cross-host consistent checkpointing. In one embodiment, the present invention transmits write quiesce commands to each of a plurality of hosts, with a specified timeout period. The write quiesce commands are transmitted at a sequence of times. After transmission of the write quiesce commands, a determination is made whether acknowledgements of quiesce have been received from each of the hosts within the designated timeout period. If so, a cross-host checkpoint is marked in the write journals, and the timeout period is decreased for the next quiesce command transmission time. If not, then a cross-host checkpoint is not marked, and the timeout period is increased for the next quiesce command transmission time. Thus the timeout period is fine-tuned so as to minimize reduction of performance of the data applications that are running on the plurality of hosts. Moreover, synchronization of clocks is not required.

The sequence of times at which quiesce commands are transmitted is controlled so as to satisfy a pre-designated production constraint, and thereby ensure that application performance is not adversely impacted. The production constraint represents a trade-off between CDP granularity and quiesce timeouts. The production constraint may specify inter alia that at most a designated percentage X% of production time be lost, and that there are at most a designated number, N, of service interruptions per hour or per day. As such, when the timeout period is increased, the frequency of quiesce is generally reduced. I.e., when the quiesce timeout is long, less quiesce requests are made, and the desired level of application performance is maintained.

There is thus provided in accordance with an embodiment of the present invention a method for generating cross-host consistent checkpoints, for use in disaster recovery systems, including transmitting, at multiple times, write quiesce commands to each of a plurality of enterprise host computers, each quiesce command including a timeout period that is adjusted at each of the multiple times, wherein the host computers are operative to write enterprise data to the source datastores, at each of the multiple times: determining whether acknowledgements indicating that a host has successfully stopped writing enterprise data to the source datastores, have been received from each of the plurality of host computers within the timeout period, if the determining is affirmative, then marking a cross-host checkpoint in a target datastore for the host computers, and reducing the timeout period for the quiesce commands transmitted by the transmitting at the next time, wherein the target datastore is generated by a continuous data protection disaster recovery system to replicate the data in the source datastores, and otherwise, increasing the timeout period for the quiesce commands transmitted by the transmitting at the next time.

There is additionally provided in accordance with an embodiment of the present invention a disaster recovery system for providing continuous data protection to an enterprise, the enterprise including a plurality of host computers that are operative to read enterprise data from source datastores and write enterprise data to source datastores, including a target datastore for replicating data written to the source datastores, and a checkpoint engine (i) for transmitting, at multiple times, quiesce commands to each of the host computers, each quiesce command including a timeout period that is adjusted at each of the multiple times, (ii) for determining, at each of the multiple times, whether acknowledgements indicating that a host has successfully stopped writing enterprise data to the source datastores, have been received from each of the plurality of host computers within the timeout period, (iii) for marking, at each of the multiple times, a cross-host checkpoint in the target datastore and reducing the timeout period for the quiesce commands at the next time, if the determining is affirmative, and (iv) for increasing, at each of the multiple times, the timeout period for the quiesce commands transmitted at the next time, if the determining is not affirmative.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to cross-host disaster recovery. When multiple host computers generate data, either per-host data or shared data, it is essential to provide consistent data replication at points in time when the hosts are synchronized across all hosts, disks and data. Such points in time are referred to as checkpoints, and in order to ensure synchronization a disaster recovery system instructs each host to stop writing data during a common time interval. Such instructions are referred to as write quiesce commands. When each of the hosts has stopped writing data at a common point in time, the journals of write commands for each host are consistent, and a checkpoint is marked in the journals. The hosts may then subsequently be recovered to the common point in time.

When a host quiesces data writing, all data applications running on the host are briefly halted and business application performance is generally impacted. A host may not be able to quiesce writing data at a given instant of time, and thus an attempt to perform consistent data replication across all hosts may require an unduly large amount of time, or may fail.

Figure 1:
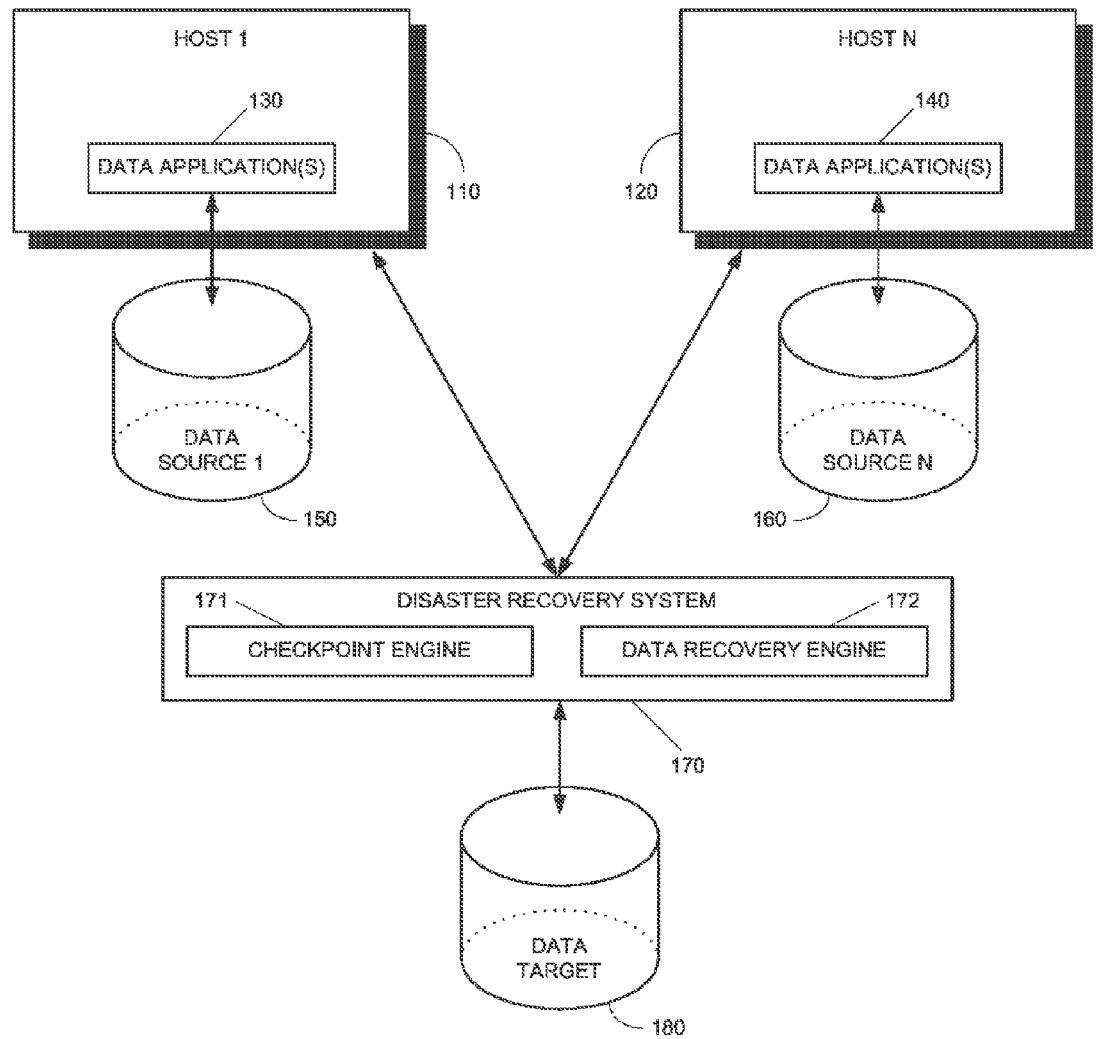
FIG. 1 is a simplified block diagram of a disaster recovery system that generates consistent cross-host checkpoints, in accordance with an embodiment of the present invention.

Reference is made to FIG. 1, which is a simplified block diagram of an enterprise disaster recovery system that generates consistent cross-host checkpoints, in accordance with an embodiment of the present invention. Shown in FIG. 1 are multiple enterprise host computers 110 and 120 that run respective enterprise data applications 130 and 140, which write data to respective enterprise source datastores 150 and 160. A disaster recovery system 170 provides continuous data protection for the enterprise. Disaster recovery system 170 replicates data sources 150 and 160 to a target datastore 180. Target datastore 180 generally includes replication disks and write journals. Disaster recovery system 170 includes a checkpoint engine 171 for generating consistent cross-host checkpoints for the enterprise. Operation of checkpoint engine 171 is described below with reference to FIG. 2. Disaster recovery system 170 also includes a recovery engine 172 which, in case of a disaster, uses target datastore 180 to recover source datastores 150 and 160 to a previous point in time.

Figure 2:
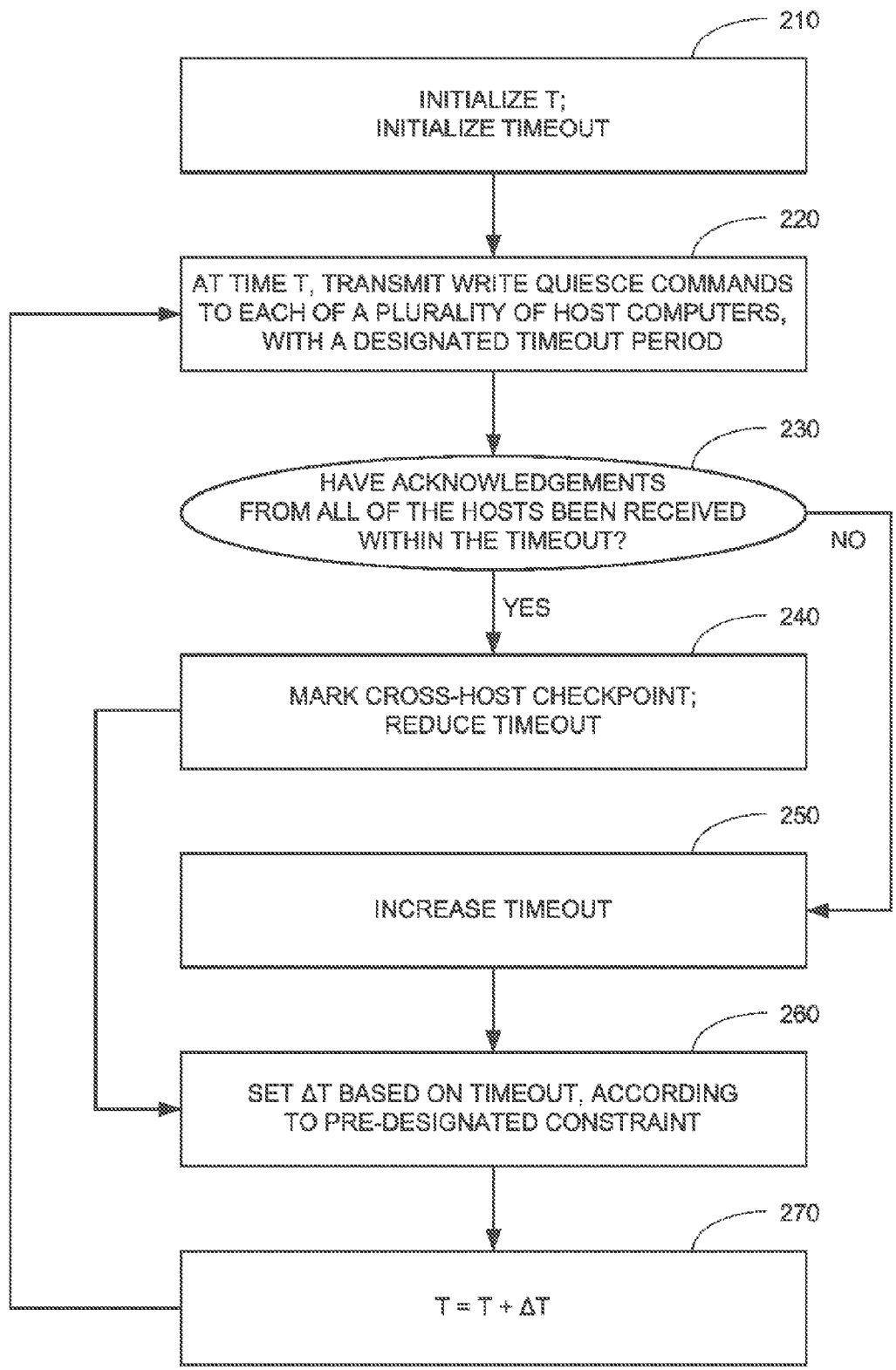
FIG. 2 is a simplified flowchart of a disaster recovery method for generating consistent cross-host checkpoints, in accordance with an embodiment of the present invention.

Reference is made to FIG. 2, which is a simplified flowchart of a disaster recovery method performed by checkpoint engine 171 (FIG. 1), for generating consistent cross-host checkpoints, in accordance with an embodiment of the present invention. The method of FIG. 2 is performed over a sequence of times. At operation 210 an initial time, T, and an initial timeout period, TIMEOUT, are set. When time T arrives, operation 220 is performed, and the disaster recovery method transmits write quiesce commands to each of a plurality of host computers, such as computers 110 and 120. The write commands include the current value of the timeout parameter, TIMEOUT.

At operation 230 a determination is made whether or not the disaster recovery system has received acknowledgements of data write quiesce from each of the plurality of host computers. If so, at operation 240 a consistent cross-host checkpoint is marked in the write journals, and the timeout parameter TIMEOUT is decreased to a smaller value, for use at the next quiesce. Otherwise, if one or more acknowledgements have not been received from host computers, then a consistent cross-host checkpoint cannot be marked and at operation 250 the timeout parameter TIMEOUT is increased to a larger value, for use at the next quiesce. In either case, each host resumes writing data after a time TIMEOUT has elapsed from receipt of the write quiesce command. As such, interruption of data applications is limited to a period of time of approximately TIMEOUT.

At operation 260 a value of $\Delta T$ is set, based on the current value of TIMEOUT. It will be appreciated by those skilled in the art that the values of $\Delta T$ control the overall frequency of write quiesce commands, and are generally set to ensure that the quiesce timeout periods do not violate a pre-designated production constraint. The production constraint represents a trade-off between CDP granularity and quiesce timeouts, and is enforced to ensure that application performance is not adversely impacted. E.g., the constraint may specify that no more than X% of production time be lost, and that there be no more than N interruptions of service per hour. Accordingly, when the value of TIMEOUT is increased, the value of $\Delta T$ is increased. If the quiesce timeouts are large, the values of $\Delta T$ are set so that quiesce requests are made less frequently, enabling the desired level of application performance to be maintained.

At operation 270, the value of T is increased by $\Delta T$ and the method returns to operation 220, to perform the next quiesce at the next time, T.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for generating cross-host consistent checkpoints, for use in disaster recovery systems, comprising:
transmitting, at multiple times, write quiesce commands to each of a plurality of enterprise host computers, each quiesce command including a timeout period that is adjusted at each of the multiple times, wherein the host computers are operative to write enterprise data to the source datastores;

at each of the multiple times:
  determining whether acknowledgements indicating that a host has successfully stopped writing enterprise data to the source datastores, have been received from each of the plurality of host computers within the timeout period;
  if said determining is affirmative, then marking a cross-host checkpoint in a target datastore for the host computers, and reducing the timeout period for the quiesce commands transmitted by said transmitting at the next time, wherein the target datastore is generated by a continuous data protection disaster recovery system to replicate the data in the source datastores; and
  otherwise, increasing the timeout period for the quiesce commands transmitted by said transmitting at the next time.

2. The method of claim 1 further comprising, at each of the multiple times, dynamically determining the value of the next time, based on the current timeout period and based on a production constraint.

3. The method of claim 2 wherein the production constraint limits the percentage of total time allocated for quiesce timeouts.

4. The method of claim 2 wherein the production constraint limits the number of quiesce timeouts that occur in a designated time period.

5. The method of claim 1 further comprising logging each command to write enterprise data to a source datastore, issued by a host computer, in a write journal of the target datastore, and promoting the logged write commands to replication disks of the target datastore at a plurality of times, and wherein said marking a cross-host checkpoint comprises marking checkpoints in each of the write journals of the target datastore.

6. The method of claim 5 further comprising recovering the source datastores based on images of the replication disks and on the write journals and the checkpoints marked therein.

7. A disaster recovery system for providing continuous data protection to an enterprise, the enterprise comprising a plurality of host computers that are operative to read enterprise data from source datastores and write enterprise data to source datastores, comprising:
  a target datastore for replicating data written to the source datastores; and
  a checkpoint engine (i) for transmitting, at multiple times, quiesce commands to each of the host computers, each quiesce command including a timeout period that is adjusted at each of the multiple times, (ii) for determining, at each of the multiple times, whether acknowledgements indicating that a host has successfully stopped writing enterprise data to the source datastores, have been received from each of the plurality of host computers within the timeout period, (iii) for marking, at each of the multiple times, a cross-host checkpoint in said target datastore and reducing the timeout period for the quiesce commands at the next time, if the determining is affirmative, and (iv) for increasing, at each of the multiple times, the timeout period for the quiesce commands transmitted at the next time, if the determining is not affirmative.

8. The system of claim 7 wherein said checkpoint engine dynamically determines, at each of the multiple times, the value of the next time, based on the current timeout period and based on a production constraint.

9. The system of claim 7 wherein the production constraint limits the percentage of total time allocated for quiesce timeouts.

10. The system of claim 7 wherein the production constraint limits the number of quiesce timeouts that occur in a designated time period.

11. The system of claim 7 wherein said target datastore comprises:
  a plurality of data disks for replication of the data in the source datastores; and
  a plurality of write journals for logging write commands issued by the host computers for writing data into the source datastores, and wherein said checkpoint engine marks a cross-host checkpoint by marking checkpoints in each of said write journals of said target datastore.

12. The system of claim 11 further comprising a data recovery engine for recovering the source datastores based on images of said replication disks and based on said write journals and the checkpoints marked therein by said checkpoint engine.

* * * * *